(12) United States Patent
Malischewsky

(10) Patent No.: US 7,004,451 B2
(45) Date of Patent: Feb. 28, 2006

(54) BALL COCK

(75) Inventor: Dirk Malischewsky, Karlsruhe (DE)

(73) Assignee: Flowserve Flow Control GmbH, Ettlingen (DE)

(*) Notice: Subject to any disclaimer, the term of this patent is extended or adjusted under 35 U.S.C. 154(b) by 7 days.

(21) Appl. No.: 10/787,886

(22) Filed: Feb. 26, 2004

(65) Prior Publication Data
US 2004/0178380 A1   Sep. 16, 2004

(30) Foreign Application Priority Data
Feb. 27, 2003 (DE) ................. 103 08 793

(51) Int. Cl.
*F16K 25/00* (2006.01)
(52) U.S. Cl. ...................... 251/161; 251/172
(58) Field of Classification Search ............ 251/160, 251/161, 172, 173
See application file for complete search history.

(56) References Cited

U.S. PATENT DOCUMENTS 3,617,025 A    11/1971   Gerbic 6,340,029 B1   1/2002   Jun

FOREIGN PATENT DOCUMENTS

| DE | 44 14 243 | 10/1995 |
|---|---|---|
| DE | 195 10 709 | 9/1996 |
| EP | 0 854 308 | 12/1997 |
| EP | 0 889 269 | 6/1998 |
| GB | 2 213 564 | 8/1989 |

*Primary Examiner*—David J. Walczak
*Assistant Examiner*—Peter deVore
(74) *Attorney, Agent, or Firm*—Collard & Roe, P.C.

(57) ABSTRACT

A ball cock has a housing that includes at least two housing parts. Each part has a flow-through channel as a flow-through path. The ball cock also includes a ball-shaped shut-off element having a passage bore as a flow path for optionally connecting the flow-through paths of the housing parts. This shut-off element is accommodated within the housing between ring-shaped seals, and can be switched by means of a switching shaft between an open position in which the flow path is released and a closed position that shuts off the flow path. At least one of the seals that accommodate the shut-off element between them is mounted in one of the housing parts, with limited axial mobility, and can be pressed against the shut-off element with a sealing surface by means of a device, whereby the seal can be switched between an axial contact pressure position and a stress-relief position.

17 Claims, 2 Drawing Sheets

BALL COCK

BACKGROUND OF THE INVENTION

CROSS REFERENCE TO RELATED APPLICATIONS

Applicant claims priority under 35 U.S.C. §119 of German Application No. 103 08 793.1 filed Feb. 27, 2003.

1. Field of the Invention

The present invention relates to a ball cock for controlling the flow of media capable of flow. The ball cock has a housing made up of at least two housing parts, each of them having a flow-through channel as a flow-through path, and has a ball-shaped shut-off organ or element having a passage bore as a flow path for optionally connecting the flow-through paths of the housing parts. The shut-off element is accommodated within the housing between ring-shaped seals, and can be switched between an open position in which the flow path is released and a closed position that shuts off the flow path, by means of a switching shaft preferably relative to an axis that runs crosswise to the flow path. At least one of the seals that accommodate the shut-off element between them is mounted in one of the housing parts, with limited axial mobility, and can be pressed against the shut-off element with a sealing surface.

2. The Prior Art

Ball cocks are known, for example, from EP 0854308 A1 and EP 0889269 A1. In the case of these ball cocks, the seal between the shut-off element configured as a shut-off ball and the housing that accommodates the shut-off ball is provided by means of a ring seal that is fixed in place and a ring seal that can move radially. These seals accommodate the shut-off ball between them and are arranged in ring chambers that are radially wider as compared with the flow-through path. The axially movable ring seal is pressed against the shut-off ball by means of a cup spring or a cup spring assembly, which in turn is supported on a shoulder that axially delimits the ring chamber.

Ball cocks of this type have proven themselves for controlling the flow of both liquid or gaseous media, as well as solids that are capable of flow. However, when the ball cocks are switched by means of the switching shaft, from the open position in which the flow path of the shut-off ball is released, into the closed position in which the flow path is shut off, and vice versa, undesirable wear of the seal surfaces involved can occur. Furthermore, because the cup springs; constantly press on one of the ring seals, in combination with the surface pressures that occur as a result., relatively great torques are required for switching, i.e. for turning the shut-off ball by means of the switching shaft. These torques require correspondingly strong switching drives, which require a comparatively great amount of space and are expensive. Furthermore, the sealing effect that can be achieved using the cup springs or cup spring assemblies is limited.

SUMMARY OF THE INVENTION

Accordingly, it is an object of the present invention to provide a ball cock in which wear during switching is reduced, and in which only comparably low torques are required for switching.

These objects are accomplished, according to the invention, by providing a ball cock in which at least one seal of the seals that accommodate the shut-off element between them is coupled with a device by means of which the seal can be switched between an axial contact pressure position in which the sealing surface of the seal is pressed against the shut-off element, and a stress-relief position in which the sealing surface of the seal rests against the shut-off element at a reduced surface pressure as compared with the sealing contact, or in which the seal is lifted off the shut-off element.

In other words, the invention is concerned with optionally pressing at least one of the axially movable seals that accommodate the shut-off element between them against the shut-off element at an increased surface pressure when the ball cock is open or closed, i.e. not being activated, and relieving the stress on the seal during a switching process, i.e. pressing it against the shut-off element at a lower surface pressure, whereby the seal is preferably lifted off the shut-off element.

It is consequently a core characteristic of the invention to make available a ball cock having an active seal system.

With these measures, it is possible to clearly reduce the wear between the shut-off element and the seals that accommodate the shut-off element. Only low torques are required for switching, so that comparatively small switching drives can be used, which require less space and are relatively inexpensive.

It is particularly advantageous if the sealing surface of the seal is pressed against the shut-off element in the contact pressure position and/or lifted off in the stress-relief position, without any effect of the spring forces that are applied to the seal, and/or if the seal can be switched between the contact pressure position and the stress-relief position without any effect of the spring forces that are applied to the seal. By eliminating the springs provided according to the state of the art, which are intended to form a seal by constantly pressing the seal against the shut-off element at a certain surface pressure, the wear and the torques during switching can be further reduced.

Another improvement can be achieved if the sealing surface of the seal is pressed against the shut-off element in the contact pressure position and/or lifted off in the stress-relief position, without any effect of the mechanical forces that are applied to the seal, and/or if the seal can be switched between the contact pressure position and the stress-relief position without any effect of the mechanical forces that are applied to the seal.

According to another embodiment, the sealing surface of the seal may be pressed against the shut-off element in the contact pressure position and/or in the stress-relief position, exclusively under the effect of the hydraulic and/or pneumatic forces that are applied to the seal, and/or that the seal can be switched between the contact pressure position and the stress-relief position without any effect of the hydraulic and/or pneumatic forces that are applied to the seal.

According to a particularly preferred embodiment, at least one of the seals that accommodate the shut-off element between them may be connected with a switching channel that is arranged in sealed manner relative to the flow-through channel, to which pressure can optionally be applied, so that the seal can be switched, i.e. changed between the contact pressure position, in which its sealing surface is pressed against the shut-off element, and the stress-relief position, in which the sealing surface of the seal rests against the shut-off element at a reduced surface pressure, as compared with the sealing contact, or in which the seal is lifted off the shut-off element.

In this way, the seal can be switched even if a medium capable of flow is flowing through the flow-through channels as well as the passage bore of the shut-off element that connects them, under high and constant pressure, in the open position of the shut-off element.

Furthermore, by means of these measures, it is possible to achieve higher closing pressures than when using the cup springs known from the state of the art, with the consequence of a better seal and therefore less leakage. In the case of a failure of the pressure medium that is being used to apply pressure to the switching channel, the ball cock remains easy to move, i.e. it can be switched electropneumatically, which results in increased operational reliability.

In this connection, the switching channel may have positive pressure applied to it by way of a fluid working medium. This arrangement allows advantageous sealing conditions, as a result of high seal surface pressures that can be achieved between the seal and the shut-off element, and it is possible to implement standardized and inexpensive switching units.

It is furthermore practical if the switching channel is arranged transverse to the flow-through path in the region of the seal. It is also advantageous if the switching channel opens up into a switching space that is delimited by wall parts of the seal that run crosswise to the flow-through path, on the one hand, and wall parts of the housing part that accommodates this seal, on the other hand. In this way, it is possible to achieve advantageous connection and force transfer conditions.

In this connection, it is advantageous if the switching space is delimited by seal ring faces of the seal that are preferably arranged parallel to one another, on the one hand, and of the housing part that accommodates this seal, on the other hand.

Particularly advantageous sealing conditions, even over extended periods of time, can be achieved if the seal is sealed by way of ring seals arranged on both sides of the switching space, relative to the flow-through channel of the housing part that accommodates this seal, and relative to the passage bore of the shut-off element.

Particularly advantageous drive and installation conditions, on the one hand, as well as advantageous possibilities for a pressure relief that can be achieved by means of the design of the seal, can be achieved if the seal has a step-shaped longitudinal cross-section at its outside circumference, which is delimited by support surfaces arranged on both sides of the switching space. In this way, the seal can support itself on opposite bearing surfaces of the housing part that accommodates the seal. This arrangement allows or imparts a limited axial movement to the seal. The step-shaped longitudinal cross-section of the seal is further delimited by the wall part that runs transverse to the flow-through path and delimits the switching space. In this connection, it is practical if the support surfaces are arranged parallel to one another, whereby advantageous axial displacement conditions and simple production possibilities can be achieved.

In this connection, it is particularly advantageous if the support surface on the one side of the switching space, which is arranged between the switching space and the sealing surface of the seal that can be laid against the shut-off element, is arranged offset towards the outside as compared to the support surface on the other side of the switching space.

Particularly advantageous switching conditions at low leakage can be achieved if, proceeding from the open position or from the closed position, respectively, of the shut-off element, in which pressure is applied to the switching channel, so that the seal is pressed against the shut-off element with its sealing surface, pressure is relieved from the switching channel, for the purpose of switching the shut-off element by means of the switching shaft, so that the seal can assume its stress-relief position, whereby essentially at the same time, the shut-off element is switched to its closed position or its open position, respectively, by means of the switching shaft.

In a particularly advantageous embodiment, the seal has working surfaces that face in the direction of the shut-off element and contact surfaces that face away from it, to which the medium to be controlled in terms of flow is applied when the flow-through channel of the housing part that accommodates this seal is filled with the medium to be controlled in terms of flow, i.e. the medium flows through it. In this arrangement, a projection surface of the working surfaces projected in a projection plane that runs perpendicular to the axial displacement direction of the seal is as great as or greater than a projection surface of the contact surfaces projected in the same projection plane. If the working surfaces are as great as the contact surfaces, it is assured that in the case of a pressure relief of the switching channel, the seal does not continue to be pressed against the shut-off element at an elevated surface pressure because of the internal pressure of the medium to be controlled in terms of flow, but rather, on the contrary, a stress-relief position with surface pressures that are clearly lower, or have even been reduced to zero, can be achieved. Zero surface pressures are possible in that the projected working surfaces are greater than the projected contact surfaces, so that in the case of a pressure relief of the switching channel, the seal is lifted off the shut-off element, because the seal is pressed in a direction that faces away from the shut-off element, within the scope of its axial mobility, by means of the internal pressure of the medium to be controlled in terms of flow.

In this connection it is practical if the working surfaces directly follow the sealing surface of the seal, transverse to the flow-through path, towards the inside, and in this way can be in direct contact with the medium to be controlled in terms of flow.

It is furthermore advantageous if at least one of the ring-shaped seals, in each instance, which are mounted on both housing parts with limited axial mobility and which accommodate the shut-off element between them, can be switched between an axial contact pressure position, in which the seals are pressed against the shut-off element with a sealing surface, and a stress-relief position, in which the sealing surfaces of the seals rest against the shut-off element at a reduced surface pressure, as compared with the sealing contact, or in which the seals are lifted off the shut-off element.

In this way, particularly advantageous sealing and switching conditions, on the one hand, as well as advantageous installation possibilities, on the other hand, can be achieved, because then installation of the seals is possible independent of the installation position, in each instance.

The measures indicated above can be combined with one another in any desired manner, within the scope of feasibility.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
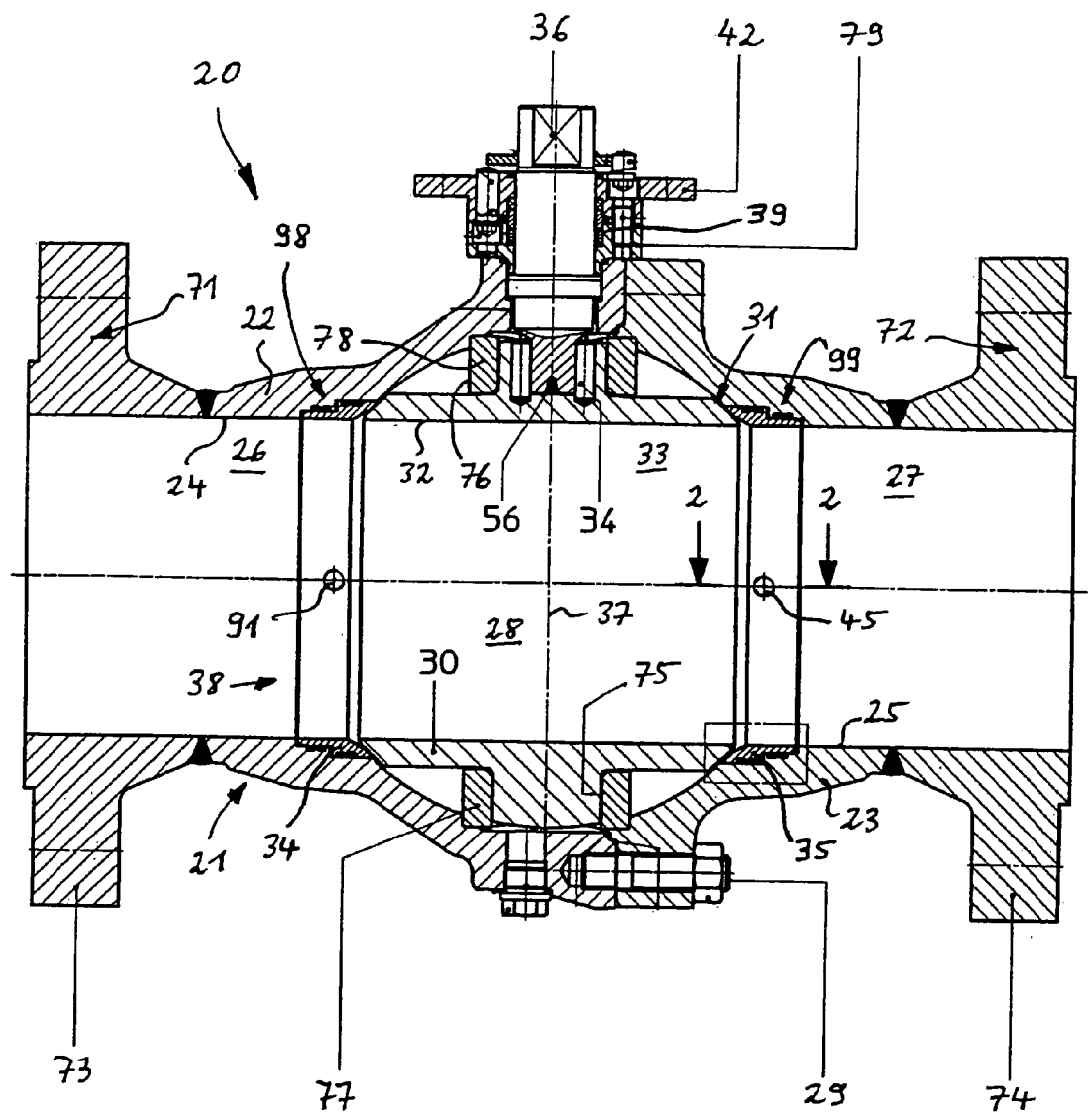
FIG. 1 is a lengthwise cross-section through a ball cock having two switchable seals according to the invention, between the housing and the shut-off element.

Referring now in detail to the drawings and, in particular, FIG. 1, a ball cock 20 according to a preferred embodiment is shown in longitudinal cross-section. Ball cock 20 possesses a housing 21 that has two housing parts 22, 23 that supplement one another to form an approximately spherical shape. The two housing parts 22, 23 are connected with one another by means of screws 29, in a manner the details of which are not of interest here. Housing parts 22, 23 have flow-through paths 26, 27 that align with one another. On the sides of housing 21 that face away from one another, pipe segments 71, 72 are welded onto housing parts 22, 23 with connection flanges 73, 74, which mediate installation of ball cock 20 into a pipeline, not shown.

Within housing 21, a shut-off ball 31 that serves as a shut-off element 30 is arranged between seals 34, 35 accommodated in the housing parts 22, 23. Shut-off ball 31 has a passage bore 32 as a flow path 33 for optionally connecting flow-through paths 26, 27 of housing parts 22, 23. Shut-off ball 31 can be switched, by means of a switching shaft 36, about an axis of rotation 37, between an open position 38 shown in FIG. 1, in which passage bore 32 aligns with flow-through paths 26, 27 of housing parts 22, 23, and a closed position that is pivoted by 90 degrees relative to open position 38. In the closed position, flow-through paths 26, 27 are separated from one another. Shut-off ball 31 can be set to any intermediate position between the open and closed positions. Axis of rotation 37 of switching shaft 36 runs at a right angle to passage bore 32 of shut-off ball 31.

Figure 2:
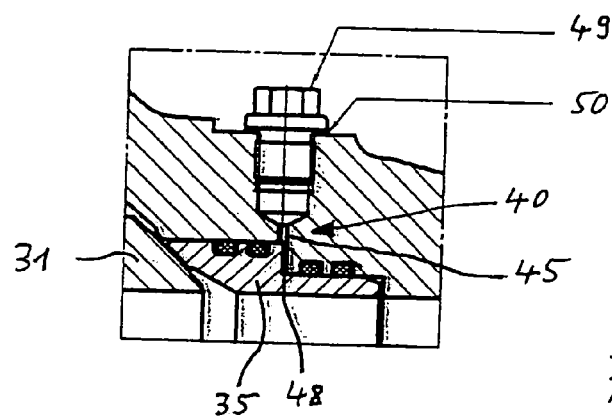
FIG. 2 is a partial section of the ball cock, on a larger scale, in the region of one of the axially movable, switchable seals along a section line 2—2 in FIG. 1.

FIG. 2 is an enlarged partial cross-section, along section line 2—2 in FIG. 1, of ball cock 20, in the region of one of the axially movable, switchable seals showing shut-off ball 31, switching space 48, closure screw 49, and seal ring 50.

As discussed below, each seal 34, 35 may be coupled with a device 40 by means of which the seal can be switched between an axial contact pressure position 41 and a stress-relief position. In the contact pressure position, a sealing surface 43 of the seal is pressed against shut-off element 30. In the stress-relief position, sealing surface 43 rests against shut-off element 30 at a reduced surface pressure as compared with the contact pressure position 41, or the seal is lifted off shut-off element 30.

Figure 4:
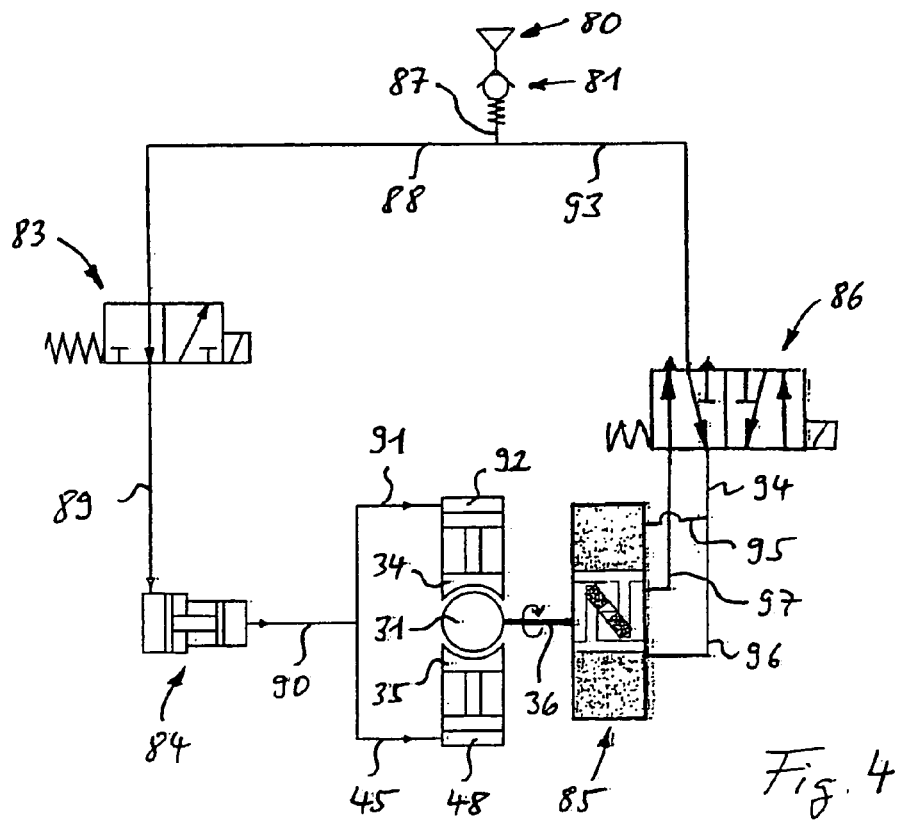
FIG. 4 is a wiring diagram to illustrate an advantageous control of a ball cock having switchable seals that accommodate the shut-off element between them, and having a switching drive for activating the switching shaft.

Shut-off ball 31 is mounted to rotate in bearing bushings 77, 78 that are accommodated in housing 21, on bearing journals 75, 76 that are lathed into opposite sides. Switching shaft 36 extends further through a housing top 79 and is mounted to rotate in housing top 79, in known manner, as well as sealed relative to the housing interior that accommodates shut-off ball 31, by means of a gland arrangement or switching shaft seal 39. Switching shaft 36 is also connected to rotate with shut-off ball 31, in a manner the details of which are not of interest here. Housing top 79 is provided with a connection plate 42, on which a switching drive 85 can be mounted, which in turn can be connected to rotate with switching shaft 36 (FIG. 4).

The switching activation of ball cock 20 between the open position and the closed position of shut-off ball 31, or vice versa, takes place by means of a stepper motor that functions as a pneumatic switching drive 85 here, which is coupled to rotate with switching shaft 36. It is understood that the switching activation of ball cock 20 can also take place by means of a hand wheel, not shown, or manually by means of similar devices, which can be accommodated at the end of the switching shaft 36 that is remote from shut-off ball 31, and can be connected to rotate with switching shaft 36.

Figure 3:
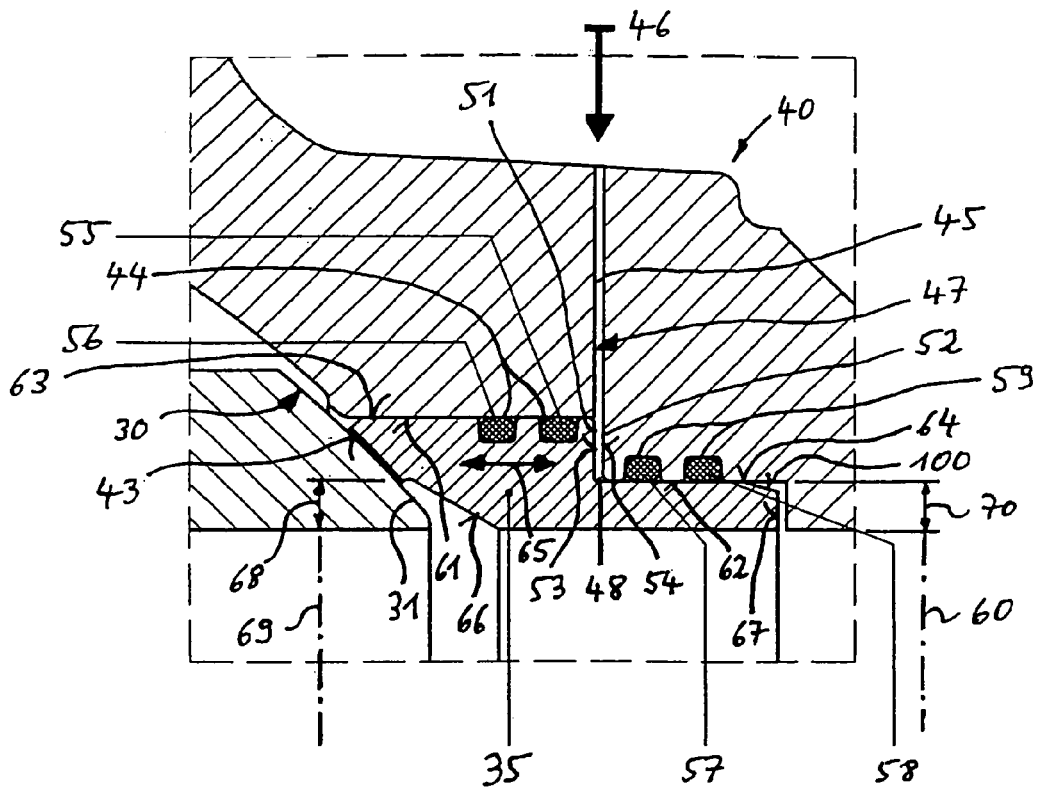
FIG. 3 is a partial section of the ball cock, on a much larger scale, in the region of one of the axially movable, switchable seals along a section line 2—2 in FIG. 1, whereby the closure screw for optional closing of the switching channel was left out for reasons of the illustration, in order to illustrate an installation situation in which the ball cock can be switched, according to the invention.

Seal 34 assigned to housing part 22 and seal 35 assigned to housing part 23 are, in each instance, accommodated in a ring chamber 98 and 99, respectively, which is widened radially relative to flow-through paths 26 and 27 that extend through these housing parts 22 and 23, and are mounted there, in each instance, with limited axial mobility. Each seal 34, 35 possesses, as FIGS. 2 and 3 show, a preferably metallic seal body having a sealing surface 43 that can be pressed against shut-off ball 31, which is configured to be adapted to the spherical ball shape of shut-off ball 31. In the exemplary embodiment shown in FIG. 1, seals 34 and 35 are configured identically, and their seal relative to housing parts 22 and 23 is also identical, in each instance.

Seal 35 is configured as a closed ring and has cylindrical support surfaces 61 and 62 on its outside circumference, which are arranged parallel to one another. Support surface 61 is offset radially towards the outside relative to support surface 62, so that the outside circumference of the wall part of seal 35 that has support surface 61 is larger than the outside circumference of the wall part of seal 35 that has support surface 62. As a result, seal 35 has a step-shaped longitudinal cross-section on its outside circumference. Seal 35 is mounted to be supported by way of support surfaces 61 and 62, on opposite bearing surfaces 63 and 64 of ring chamber 99, whereby cylindrical bearing surfaces 63 and 64 are also arranged parallel to one another. By means of this arrangement and configuration of support surfaces 61 and 62, on the one hand, and of bearing surfaces 63 and 64, on the other hand, an axial displacement movement of seal 35 in the direction of double arrow 65, in other words parallel to flow-through path 26, is made possible.

At the transition from support surface 61 to support surface 62, seal 35 has a wall part 51 having a ring face 53, which is arranged perpendicular to support surfaces 61 and 62. The distance of this ring face 53 from sealing surface 43 of seal 35 is selected so that when sealing surface 43 of seal 35 lies against the outside surface of shut-off ball 31, an axial switching space 48 is formed between ring face 53 and opposite ring face 54 of a wall part 52 of housing part 23 that accommodates this seal 35. This ring-shaped switching space 48 allows a limited axial displacability of seal 35 in the direction of double arrow 65.

A cylindrical switching channel 45, which is arranged perpendicular to flow-through path 26 here, i.e. perpendicular to the center longitudinal axis of housing part 23, opens into switching space 48, whereby in the longitudinal cross-section shown in FIG. 3, the inside surfaces of switching channel 45 align with ring faces 53 and 54, which axially delimit switching space 48.

Switching channel 45 is arranged offset clockwise by an angle of 90 degrees, here, relative to the axis of rotation 37 of switching shaft 36. In contrast, switching channel 91, which is assigned to seal 34 that has limited axial mobility, which in turn is mounted in ring chamber 98 of the housing part 22, is arranged offset counterclockwise by an angle of 90 degrees, relative to axis of rotation 37 of switching shaft 36, so that the two switching channels 45 and 91 extend on the same side of ball cock 20. This arrangement of switching channels 45 and 91 allows advantageous space conditions for the connection of hydraulic connecting lines, which are preferably brought together to form a common hydraulic channel 90 (FIG. 4). For the remainder, the conditions below, which will be described using the example of switching channel 45 and seal 35, apply analogously to the switching channel 91 and the seal 34.

Switching space 48 can have pressure applied to it by way of switching channel 45 (arrow 46), in that preferably, a hydraulic working medium 47 introduced into switching channel 45 and switching space 48 has pressure applied to it (arrow 46). For this purpose, switching channel 45 opens up into a connecting bore at its end facing away from seal 35, which bore is provided with an inside thread here, for connecting a line 45 (FIG. 4), which in turn can have pressure applied to it in switched manner.

Applying positive pressure to switching space 48 (arrow 46) has the results that seal 35 is moved in the axial direction towards shut-off ball 31, until its sealing surface 43 is pressed against shut-off ball 31 at a surface pressure that corresponds to the pressure that was set (arrow 46).

Switching channel 45 and switching space 48 are sealed relative to flow-through channel 25 of housing part 23 by means of ring seals 55, 56, 57, 58 that are configured as O-rings. In this connection, the two seals 55 and 56 are arranged between switching channel 45 and sealing surface 43 of seal 35, to form a seal between support surface 63 and bearing surface 61, and the two ring seals 57 and 58 are arranged between switching channel 45 and ring-shaped contact surface 67 of seal 35 that faces away from sealing surface 43, to form a seal between support surface 62 and bearing surface 64. Ring seals 55 and 56 are accommodated in parallel ring grooves 44 of seal 35 that are axially spaced apart and have a trapezoid-shaped cross-section and are open to the outside. Ring seals 57 and 58 are also accommodated in parallel ring grooves 59 that are axially spaced apart and open towards the outside, but in contrast to ring grooves 44, they rare arranged in the wall part of housing part 32 that lies opposite the wall part of seal 35 that has support surface 62. Ring seals 55 and 57, which are arranged immediately adjacent to switching channel 45 and switching space 48, respectively, are made up of a material that is configured to be attuned with working medium 47, while ring seals 56 and 58 are made up of a material that is configured to be attuned with medium 28 to be controlled in terms of flow.

Seal 35 has a working surface 66 that follows sealing surface 43, which extends at a slant towards the inside, away from shut-off ball 31 and is slightly set back relative to sealing surface 43 and arranged at a flatter angle. This working surface 66 is in direct contact with medium 28 to be controlled in terms of flow, when flow-through channel 25 is filled with medium, i.e. when medium flows through it. The projection of this working surface 66 into a projection plane 69 that is arranged perpendicular to flow-through path 26, i.e. perpendicular to the center axis of housing part 23, results in an effective projection surface 68. In the exemplary embodiment shown, this effective projection surface 68 is as great as an effective projection surface 70 of the contact surfaces that are located at the other end of seal 35, i.e. of end contact surface 67 and of slanted surface 100 that follows towards the outside and is inclined towards sealing surface 43, whereby this projection surface 70 is achieved by means of a projection of these contact surfaces 67, 100 into a projection plane 60 arranged parallel to projection plane 69. Contact surfaces 67 and 100 are also in direct contact with medium 28 to be controlled in terms of flow, when flow-through channel 25 is filled with medium 28 to be controlled in terms of flow, i.e. when medium 28 flows through it, and when seal 35 rests against shut-off ball 31 with its sealing surface 43.

As a result of the equally great effective projected working surfaces 68 and projected contact surfaces 70 that face away from them, in the exemplary embodiment, the pressure forces exerted by medium 28 to be controlled in terms of flow, on contact surfaces 67, 100, on the one hand, and working surface 66, on the other hand, cancel each other out, with the result that the pressure forces of medium 28 do not displace seal 35 in its axial position, particularly do not press seal 35 against shut-off ball 31 with its sealing surface 43 at an elevated surface pressure. In this manner, it is assured that a pressure relief of switching space 48 also has the effect of a reduction in the surface pressure with which seal 35 presses down on shut-off ball 31 with its sealing surface 43, in a corresponding level.

In the case of a complete pressure relief of switching space 48, in other words if the pressure (arrow 46) in switching channel 45 is reduced to a value of zero., no significant forces of seal 35 then act on the shut-off ball any longer, so that switching ball cock 20, in other words rotating shut-off ball 31 by means of rotating switching shaft 36, is possible with complete stress relief of seal 35. In this way, the wear between sealing surface 43 of seal 35 and the opposite contact surfaces of shut-off ball 31 during switching, in other words due to switching processes, is minimized.

This effect can be further improved if projection surface 68 of working surface 66 is selected to be greater than projection surface 70 of contact surfaces 67, 100. This improvement results because a pressure exerted by medium 28 to be controlled in terms of flow, on seal 35, acts so that a resulting force on the seal is indicated, which tries to push the seal away from shut-off ball 31. In the case of a complete pressure relief of switching space 48, this force lifts seal 35 off shut-off ball 31, so that wear can no longer occur at sealing surface 43 and at the opposite contact surfaces of shut-off ball 31.

FIG. 4 shows an advantageous exemplary embodiment of a switching arrangement of important components of the invention, using a wiring diagram. In this connection, 80 designates a compressed air connector for connecting a compressed air pump, not shown. The compressed air generated by the pump can be passed through supply channel 87 by way of kick-back valve 81. This channel is divided into a working channel 88 as well as a working channel 93. In working channel 88, the compressed air can be passed to a 3/2-way valve by way of a kick-back valve (not shown). In the position of 3/2-way valve 83 shown in FIG. 4, the compressed air is passed through this kick-back valve into working channel 89, which in turn opens into a pressure amplifier 84. In this pressure amplifier 84, the pressure imparted by the compressed air is amplified in an outgoing hydraulic channel 90, i.e. the pressure amplifier is supplied with compressed air on its input side, while on its output side, the pressure is transferred by way of a hydraulic medium. Hydraulic channel 90 branches into two switching channels 45 and 91. Switching channel 45 opens into switching space 48, which is assigned to seal 35, while switching channel 91 opens into switching space 92 that is assigned to seal 34. These axially movable seals 34 and 35 can therefore have pressure applied to them jointly, by way of hydraulic channel 90, in order to be able to be pressed against shut-off ball 31 with their sealing surfaces in this manner.

Shut-off ball 31 is connected to rotate with switching shaft 36, which in turn is connected to rotate with a drive element of switching drive 85, which can be used to rotate the shut-off ball by 90 degrees from the open position into the closed position, or vice versa, but also into any desired intermediate positions. Switching drive 85 is pneumatically controlled. For this purpose, compressed air can be supplied by way of working channel 93, whereby switching into the open position or the closed position, respectively, can be achieved using a 5/2-way valve 86. In the switching position of 5/2-way valve 86 shown in FIG. 4, the compressed air can be passed, by way of channel 93, into a channel 94 connected with the output of the valve, which divides up into channels 95 and 96, which allow switching of switching drive 85. In this connection, the compressed air is passed back to 5/2-way valve 86 by way of channel 97, and can be vented there.

In order to relieve the pressure on seals 34 and 35, 3/2-way valve 83 is switched to its second position, with the consequence that the compressed air that is compressed in the compressed air chamber of pressure amplifier 84 as well as in working channel 89 can then be vented by way of 3/2-way valve 83, so that hydraulic channel 90 is relieved of pressure. As soon as this state has been achieved, however preferably essentially at the same time, 5/2-way valve 86 is switched into its second position, so that then the compressed air can get into channel 97 that previously served as a venting channel, by way of working channel 93, in order to reach a rotating return of shut-off valve 31 by 90 degrees, using switching drive 85, in this manner. In this position of 5/2-way valve 86, the out-flowing compressed air is passed into channel 94 by way of channels 95 and 96, and can be vented there by way of 5/2-way valve 86.

Accordingly, while only a few embodiments of the present invention have been shown and described, it is to be understood that many changes and modifications may be made thereunto without departing from the spirit and scope of the invention as defined in the appended claims.

What is claimed is:

1. A ball cock for controlling media flow comprising:
   (a) a housing having at least two housing parts, each of said housing parts having a respective flow-through channel for forming a respective flow-through path for a medium;
   (b) a ball-shaped shut-off element having a passage bore for forming a flow path for selectively connecting said flow-through paths, said shut-off element being disposed within only two housing parts of said housing between ring-shaped seals and being movable via a switching shaft between an open position where said flow path is opened and a closed position where said flow path is closed;
   wherein at least one of said seals is mounted in one of said housing parts with limited axial mobility and has a sealing surface for pressing against said shut-off element;
   wherein said at least one seal is coupled with a device for moving said at least one seal between an axial contact pressure position where said sealing surface is pressed against said shut-off element and a stress-relief position where said sealing surface either rests against said shut-off element at a reduced surface pressure relative to said contact pressure position or is lifted off said shut-off element; and
   wherein said sealing surface is pressed against said shut-off element in the contact pressure position, irrespective of any spring forces that are applied to said at least one seal; and
   (c) a switching channel connected to said at least one seal and arranged in sealed manner relative to an associated one of said flow-through channels, to selectively receive pressure of a separate working medium for causing said at least one seal to move between the contact pressure position and the stress-relief position;
   wherein said at least one seal has working surfaces that face toward the shut-off element and contact surfaces that face away from said shut-off element, said working surfaces and said contact surfaces receiving the medium when the medium flows through the flow-through channel of an associated one of said flow-through channels for said at least one seal and when said at least one seal is pressed against the shut-off element with its sealing surface, said working surfaces having a first projection surface projected in a first projection plane that runs perpendicular to an axial displacement direction of the seal and said contact surfaces having a second projection surface projected in a second projection plane arranged parallel to the first projection plane, said first projection surface being at least as great as said second projection surface.

2. The ball cock according to claim 1, wherein said at least one seal is movable between the contact pressure position and the stress-relief position irrespective of any spring forces that are applied to said at least one seal.

3. The ball cock according to claim 1, wherein said sealing surface is pressed against the shut-off element in the contact pressure position or in the stress-relief position, irrespective of any mechanical forces that are applied to said at least one seal.

4. The ball cock according to claim 1, wherein said at least one seal is movable between the contact pressure position and the stress-relief position irrespective of any mechanical forces that are applied to said at least one seal.

5. The ball cock according to claim 1, wherein said at least one seal is movable between the contact pressure position and the stress-relief position exclusively by hydraulic or pneumatic forces that are applied to said at least one seal.

6. The ball cock according to claim 1, wherein said at least one seal is movable between the contact pressure position and the stress-relief position irrespective of any hydraulic or pneumatic forces that are applied to said at least one seal.

7. The ball cock according to claim 1, wherein a fluid working medium applies positive pressure to said switching channel.

8. The ball cock according to claim 1, wherein said switching channel is arranged transverse to an associated one of said flow-through paths.

9. The ball cock according to claim 1, wherein said switching channel opens up into a switching space that is delimited by respective wall parts of said at least one seal that run transverse to an associated one of said flow through paths, and of an associated one of said housing parts that accommodates said seal.

10. The ball cock according to claim 9, wherein said wall parts delimiting said switching space comprise respective ring faces of the seal and of the associated housing part.

11. The ball cock according to claim 10, wherein said ring faces are arranged parallel to one another.

12. The ball cock according to claim 9, wherein said at least one seal is sealed by way of ring seals arranged on both sides of the switching space, relative to the flow-through channel of the associated housing part, and relative to said passage bore.

13. The ball cock according to claim 9, wherein said at least one seal has a step-shaped longitudinal cross-section at an outside circumference at the seal, delimited by support surfaces arranged on first and second sides of said switching space for supporting said at least one seal on opposite bearing surfaces of the associated housing part and for allowing a limited axial movement of said at least one seal, said step-shaped longitudinal cross-section being further delimited by the wall part delimiting the switching space that runs transverse to the associated flow-through path.

14. The ball cock according to claim 13, wherein one of said support surfaces on the first side of said switching space is arranged between the switching space and the sealing surface of said at least one seal and is offset towards the outside relative to the support surface on the second side of the switching space.

15. The ball cock according to claim 1, wherein said switching shaft causes pressure to be relieved from the switching channel to move the shut-off element between the open position and the closed position so that said at least one seal assumes the stress-relief position.

16. The ball cock according to claim 1, wherein the working surfaces directly follow the sealing surface of said at least one seal, transverse to the associated flow-through path towards the inside.

17. The ball cock according to claim 1, wherein each of said ring-shaped seals is mounted in a respective one of said two housing parts with limited axial mobility and accommodates the shut-off element between said seals and is movable by the device between an axial contact pressure position, in which sealing surfaces of the seals are pressed against the shut-off element and a stress-relief position, in which the sealing surfaces of the seals either rest against the shut-off element at a reduced surface pressure relative to said contact pressure position or are lifted off said shut-off element.

* * * * *